(12) United States Patent
Dawson

(10) Patent No.: US 11,120,563 B2
(45) Date of Patent: Sep. 14, 2021

(54) APPARATUS AND METHOD FOR REGISTERING RECORDED IMAGES

(71) Applicant: THE SECRETARY OF STATE FOR DEFENCE, Salisbury (GB)

(72) Inventor: John Edward Dawson, Salisbury (GB)

(73) Assignee: The Secretary of State for Defence, Salisbury (GB)

(*) Notice: Subject to any disclaimer, the term of this patent is extended or adjusted under 35 U.S.C. 154(b) by 178 days.

(21) Appl. No.: 16/475,259

(22) PCT Filed: Jan. 16, 2018

(86) PCT No.: PCT/GB2018/000006
§ 371 (c)(1),
(2) Date: Jul. 1, 2019

(87) PCT Pub. No.: WO2018/138470
PCT Pub. Date: Aug. 2, 2018

(65) Prior Publication Data
US 2019/0333235 A1  Oct. 31, 2019

(30) Foreign Application Priority Data

Jan. 27, 2017 (GB) .................................... 1701363

(51) Int. Cl.
*G06T 7/32* (2017.01)
*G06T 5/00* (2006.01)
*G06T 5/50* (2006.01)

(52) U.S. Cl.
CPC ............... *G06T 7/32* (2017.01); *G06T 5/006* (2013.01); *G06T 5/50* (2013.01);
(Continued)

(58) Field of Classification Search
CPC .. G06T 7/32; G06T 5/006; G06T 5/50; G06T 2207/10032
See application file for complete search history.

(56) References Cited

U.S. PATENT DOCUMENTS 5,872,630 A * 2/1999 Johs .......................... G01J 4/00
356/369
6,219,462 B1 * 4/2001 Anandan ............. G06K 9/6203
382/278

(Continued)

FOREIGN PATENT DOCUMENTS

WO  2008100302 A1  8/2008

OTHER PUBLICATIONS

Grodecki et al., "Block Adjustment of High-Resolution Satellite Images Described by Rational Polynomials," Photogrammetric Engineering & Remote Sensing, 2003, vol. 69, No. 1, pp. 59-68.

(Continued)

*Primary Examiner* — Santiago Garcia
(74) *Attorney, Agent, or Firm* — Kilpatrick Townsend & Stockton LLP; Dean W. Russell

(57) ABSTRACT

A method and apparatus are provided for registering a base recorded image (9) of an object or terrain with a secondary recorded image (10) of the object or terrain, using a base image sensor model (12), secondary image sensor model (13) and elevation information (11). A plurality of biases (24) and respective matched biases (29) are applied to the secondary image sensor (model 13) and base image sensor model (12), to determine a plurality of corrected sensor models (26) and respective nominally corrected base image sensor models (31). Each corrected sensor model (26) and respective nominally corrected base image sensor model (31) is used to reproject (27) the secondary recorded image (10), and in each case the reprojected secondary recorded image is correlated (19) with the base recorded image (12) to ascertain a correlation score (20) and adjustments to the bias corrections (32). The correlation score being evaluated to determine optimally corrected sensor models and and/or an optimally transformed image.

12 Claims, 9 Drawing Sheets

(52) U.S. Cl.
CPC .............. *G06T 2207/10032* (2013.01); *G06T 2207/20221* (2013.01); *G06T 2207/30184* (2013.01)

(56) References Cited

U.S. PATENT DOCUMENTS

| | | | |
|---|---|---|---|
| 2009/0232388 A1* | 9/2009 | Minear | G06T 3/0075 382/154 |
| 2010/0110074 A1* | 5/2010 | Pershing | G06T 7/73 345/423 |
| 2012/0127163 A1* | 5/2012 | Kim | H04N 13/139 345/419 |
| 2013/0201403 A1* | 8/2013 | Iversen | H04N 13/337 348/659 |
| 2014/0064554 A1 | 3/2014 | Coulter et al. | |
| 2016/0321838 A1* | 11/2016 | Barone | G06T 5/50 |
| 2017/0132465 A1* | 5/2017 | Kutter | G06T 7/0004 |
| 2018/0176531 A1* | 6/2018 | Liu | G06T 5/005 |
| 2019/0004543 A1* | 1/2019 | Kennedy | H04N 5/2171 |
| 2019/0201110 A1* | 7/2019 | Kuenen | A61B 8/466 |
| 2020/0020072 A1* | 1/2020 | Ely | G06T 3/0075 |
| 2020/0236270 A1* | 7/2020 | Pourreza Shahri | G06T 7/73 |

OTHER PUBLICATIONS

United Kingdom Patent Application No. GB1800752.6, Combined Search and Examination Report dated Jun. 29, 2018, 6 pages.
International Patent Application No. PCT/GB2018/000006, International Search Report and Written Opinion dated Apr. 6, 2018, 15 pages.
Ozcanli, Ozge C., et al., "Automatic Geo-location Correction of Satellite Imagery," 2014 IEEE Conference on Computer Vision and Patter Recognition Workshops, 2014, pp. 307-314, IEEE.
International Patent Application No. PCT/GB2018/000006, International Preliminary Report on Patentability (IPRP) dated Aug. 8, 2019, 10 pages.

* cited by examiner

APPARATUS AND METHOD FOR REGISTERING RECORDED IMAGES

The present invention relates to the field of sensing imagery, in particular to the registration of sensed images (images recorded by a sensor such as a camera).

There are a number of practical applications that use sensed imagery including geospatial mapping, surveillance, medical imaging and robotics. Within these applications there is a requirement to be able to compare different sensed images of the same location with each other (for instance to detect changes in a geographic location over time, or to monitor changes in medical imagery of a patient), and to fuse the information from multiple sensed images (for instance the fusion of sensed images taken in different wavebands in order to derive a better understanding of a physical object). A first key step in these processes is to geometrically align the sensed images into the same coordinate system, such that pixels in the images correspond to the same features of the location imaged. This process is known as image registration.

A sensed image is an image generated by a sensor observing a physical object, location or environment. The sensor itself has intrinsic properties and characteristics including, but not limited to, waveband of operation, number of sensing elements, field of view and lens variations. These intrinsic characteristics will influence the appearance of any resultant sensed image generated by the sensor. Generally these properties are known and sensed images can be corrected accordingly. However, a sensed image will also be influenced by the geometry of the sensor relative to the object or location being imaged (the viewing geometry). In particular for remote sensing, the viewing geometry can have dramatic effects on the representation of a three dimensional surface as a two dimensional image. For instance, a sensor such as a photographic camera observing the ground from on-board an aircraft may produce a sensed image of a location comprising a tall building that is directly beneath the aircraft (at the nadir), or may produce a sensed image of the location when the location is forwards and below the aircraft.

This is illustrated in FIG. 1 and FIG. 2. The different viewing geometries will result in sensed images with different perspective views of the location. At nadir the sensed image will only show the top of the tall building, whereas other viewing geometries will result in sensed images where the tall building appears to lean away from the centre of the image. Practically this makes direct analysis and comparison of sensed imagery difficult. It is therefore a requirement in remote sensing applications that sensed images of a location are first transformed into the same coordinate system, providing the same perspective view of the location in each image, and such that three dimensional objects in the location are represented in the same way.

In many remote sensing applications a given sensor's position, orientation (and therefore line of sight), relative to some coordinate system, are known (albeit often only approximately) enabling the determination of the approximate pixel locations (line and sample) in the sensed image corresponding to real world coordinates (latitude, longitude, height). Alternatively, where sensor position and orientation is not available, a sensor model (e.g. rigorous or replacement) may be used to provide this ground to image transformation, or processing (such as that from the field of photogrammetry) can be applied to derive such a transformation. Common to all such transformations, a three dimensional world coordinate is being mapped to a two dimensional image coordinate, and therefore has a unique solution. However, mapping image coordinates to World coordinates does not have a unique solution, owing to the need to map a two dimensional coordinate into a three dimensional space.

Therefore in order to convert image coordinates in a sensed image to World coordinates it is necessary to use elevation information for the location imaged, or to use some other means of constraining the World coordinates to two degrees of freedom. A person skilled in the art will be familiar with the provision of elevation information in different forms including by way of a Digital Elevation Model (DEM). For the purposes of this document the term ground to image transformation encapsulates any transformation from world to image coordinates and its inverse (with suitable constraint) from image to ground coordinates. Thus it becomes feasible to convert image coordinates of features in a first sensed image, to ground coordinates, and then to convert those ground coordinates to image coordinates in a second sensed image, thereby deriving a transformation between different image coordinates. In reality this only provides an approximate mapping between the two sets of image coordinates for reasons including;

Inaccuracy of the ground to image transformation/s

Inaccuracy of the elevation model (including random errors, lack of fidelity and interpolation errors and bias caused by the elevation data being misaligned in any dimension).

Thus the error/s in the ground to image transformation/s must be derived and corrected in order to be truly confident that the coordinates and representation of features in sensed images are accurate when converting between coordinate systems.

Therefore it is an aim of the invention to provide a method that overcomes these issues such that sensed images can be accurately registered with each other in a common coordinate system.

According to a first aspect of the invention there is provided a method as set out in claim 1

According to a second aspect of the invention there is provided an apparatus as set out in claim 12.

Image registration is the process of taking two images and identifying a transformation that describes how the image coordinates in one image map to corresponding locations (objects or terrains) in the other image. A registered image is an image that has had such a transformation applied to it, such that it aligns with another image, often referred to as the base image. The image to which the transformation is applied may be referred to as the secondary image. Often the base image is an image that was recorded earlier than the secondary image, but optionally the images may be images that were recorded simultaneously from different sensors.

The term "performing an image comparison of the transformed image with its corresponding image or modified version thereof" covers various possibilities, including that the base image is transformed for comparison to the secondary, the secondary is transformed for comparison to the base, or that both are transformed—for example into an orthorectified view—and compared to each other. Additionally it is possible that the image comparison is completed without transforming either image, and that the transformation is used directly within the image comparison calculation applied to the raw images.

A ground to image transformation is used to relate real World coordinates (for instance latitude, longitude, and height) to their approximate locations in the image (image coordinates comprising line and sample). This may be provided in or derived from sensor metadata (for instance base image metadata and secondary image metadata for the sensors having obtained the respective base and secondary images) or from photogrammetric processing. A person skilled in the art will be familiar with the requirement for elevation information of the location being imaged (in particular the use of Digital Elevation Models), such that any conversion of image coordinates to World coordinates has a unique solution. The availability of a ground to image transformation means that in theory, features of a location having coordinates (pixels) in a secondary image, can have their corresponding coordinates (pixels) in a base image determined, thereby deriving a transformation that registers the two images. The geometric relationship between a pair of images and the scene is illustrated in FIG. 7, which shows how the ground to image transformation for each image and knowledge of the in scene elevation data can be used to geometrically relate one image to the other.

A registered image is a secondary image that has undergone this process i.e. it has been converted to the coordinate system of the base image. This approach is considered an approximate registration of the images as the accuracy will be limited by errors in the ground to image transforms and elevation information which cause inaccuracies in world coordinates corresponding to positions in one image, which are compounded when they are also inaccurately projected into the other image. This is illustrated in FIG. 8 which shows that with an uncorrected ground to image transformation a feature at a given ground coordinate does not get projected to the true location in the image of that feature, and similarly a feature at a given location in an image does not get projected to the correct location of that feature on the ground.

An improvement to the approximate registration approach is to generate modified ground to image transformations that more accurately represent the mapping between coordinate systems. If the transformations can be corrected such that they become substantially error-free, then the accuracy of mapping locations in the world to their corresponding features in the images (i.e. mapping World to image coordinates and vice versa) will be entirely dependent upon the accuracy of the elevation information. This is illustrated in FIG. 9 which shows the corrected ground to image transformations for a pair of images yielding an accurate image to image transformation. Practically however the errors in the ground to image transformations are not known and so cannot be directly corrected for and must be derived through some other means.

Grodecki, J and Dial, G (2003. *Block Adjustment of High-Resolution Satellite Images Described by Rational Polynomials; Photogrammetric Engineering & Remote Sensing* Vol. 69 No.1; pp. 59 68.) present a method by which a number of geometric parameters of a sensor model can be replaced by a single adjustment parameter in each image dimension. This is particularly relevant to remote sensing applications where the distance between the location and the sensor is large relative to the field of view of the sensor, and the sensor metadata is relatively accurate.

This is deemed to be the case and a pair of individual bias parameters is used to correct the ground to image transformations. The biases applied to the transformations are offsets in image line and sample. The term corrected transformation refers to the transformation including these offset parameters and the uncorrected transformation refers to the transformation before the offsets are calculated and applied. A nominally corrected transformation has an offset applied to it but it is not known whether this is the true offset, and therefore whether it is indeed the corrected transformation.

Following approximate registration of images using the uncorrected ground to image transforms and an elevation model the misalignment between the base image and the registered image will be largely due to four sources of error:

Image alignment error. This is caused by uncorrelated errors in the transformation models causing the same terrain or feature in each image to project onto the elevation data in different locations. This is typically the major component of the misalignment and manifests itself largely as a linear offset between the images.

Terrain perspective error. This is caused by one or both images being projected onto the elevation model at the wrong location and resulting in the differences in terrain perspective between the two images being incorrectly accounted for.

Bias errors in the elevation data. With perfect ground to image transformations for all images, the registered image will only be accurately aligned with the base image if the elevation data is also perfect aligned with real world coordinates. However, usually there are errors both horizontally and vertically in elevation data so this will be a source of image misalignment.

Random errors in the elevation data—For example lack of resolution or other localised flaws with the elevation data will also cause misalignment of the registered images.

Through use of an appropriate image comparison operation (for example cross correlation or phase correlation), the image alignment error between the images output by the approximate registration approach discussed previously can be recovered independently of any terrain perspective errors or errors in the elevation data. Such an offset can be considered the relative correction to the base image ground to image transformation. FIG. 10 shows how this relative correction can enhance the image to image relationship for some points within the images but does not necessarily align the images with the elevation data. The result of applying this relative correction is that the larger flatter areas of the images will be well aligned but at areas of changing gradient on the ground the images will appear misaligned.

Therefore, by repeating the approximate registration approach, but with a relatively corrected base transformation, the resultant registered image will not have an image alignment error, but may still present terrain perspective errors and errors due to inaccuracy of the elevation data. This is owing to the fact that the necessary correction to the secondary image has still not been derived. Deriving the corrections for both images is essential if the sensed images are to project onto the elevation information such that features in the images align with the same features in the elevation information and terrain perspective errors are minimised. Note that this minimisation occurs when the corrected transformation models align the images with the elevation data despite any bias in its alignment with real world coordinates, and not necessarily when the corrected models are perfectly aligned with the real world.

Therefore a plurality of nominal corrections are applied to the secondary image's ground to image transformation and an equivalent plurality of nominal corrections are applied to the base image ground to image transformation to generate a plurality of sets of nominally corrected ground to image transformations. The secondary image is transformed using each of the sets of nominally corrected ground to image transformations, and the elevation information, thereby generating a plurality of transformed images. Each of the transformed images is then compared (through an image comparison operation) to the base image to determine a value for a measure of image similarity. The set of corrections which maximises this measure of image similarity will yield registered images with minimised image alignment and terrain perspective errors. A set in this context comprises corrections to the base and secondary image ground to image transformations.

The image comparison operation may be a correlation operation (a cross correlation or phase correlation). The measure of image similarity for this embodiment of the invention may be a correlation score. The inventor has determined that a particularly well suited correlation operation is phase correlation owing to its tolerance of intrinsic differences between the images including but not limited to sensor noise, illumination conditions, shadows, man-made changes, as well as differences in excess of linear shift, for instance slight differences in rotation, scale and also terrain distortion.

Where an image correlation (for example cross correlation or phase correlation) is used as the comparison operator, a person skilled in the art will recognise that computing the image correlation between the base image and a registered secondary image (calculated using a nominal correction to the secondary image ground to image transformation), will simultaneously compute the correlation score for each possible base image correction. The maximum score will correspond to the base image correction that matches that nominal secondary image correction.

This has the advantage that it reduces the dimensionality of the optimisation problem to the number of degrees of freedom of the correction model for one image rather than both images. The problem becomes one of finding the optimal nominal correction to the secondary image and calculating the matched correction for the base image transformation as well as the image similarity value via correlation. The optimal correction is that which maximises image similarity.

However, computing the image similarity in this manner has the disadvantage that a bias is introduced. The method favours nominal secondary image transformations which correspond to matched base image corrections with small magnitude. This is due to the degree of overlap between the base image and the nominally registered image decreasing as larger corrections are applied to the base image. This reduced overlap reduces the image correlation as it applies to an increasingly small sub-image. Additionally the varying levels of overlap between the base image and successive nominally registered images may cause the image similarity measure to fluctuate significantly with small changes in secondary image correction parameters, which is undesirable for an optimisation algorithm that seeks the optimum value using gradient information. This is particularly apparent when using phase correlation as the image comparison metric and is particularly detrimental when the robustness of phase correlation to differences in appearance and content between the images is required in order to successfully identify, the optimum alignment.

This can be mitigated by computing the matched base image correction for each candidate secondary image correction as above and then re-computing a plurality of registered images using the plurality of nominal secondary image corrections along with the precomputed matched base image correction. Recomputing the image similarity score for each candidate nominal secondary image correction using the precomputed matched corrections for the base image will yield a set of image similarity scores that have been computed with full overlap between the base image and nominally registered secondary image. This results in a set of scores that can be compared to each other without bias. Moreover recomputing the image similarity in this manner enables the similarity measure to be used as a stable cost function for an optimisation algorithm.

In preferred embodiments of the invention the transformations from ground to image coordinates are provided as mathematical functions from world coordinates to image coordinates. In this case following the calculation of the matched correction for an initial estimate of the secondary image correction terms, the matched corrections for subsequent estimates can be computed directly. One such method is shown in equation 1.

$$\begin{pmatrix} b_{line} \\ b_{samp} \end{pmatrix} = \begin{pmatrix} b_{line_0} \\ b_{samp_0} \end{pmatrix} + J_b J_s^{-1} \begin{pmatrix} s_{line} - s_{line_0} \\ s_{samp} - s_{samp_0} \end{pmatrix} \quad \text{Equation 1}$$

$s_{line_0}$ and $s_{samp_0}$ are the initial estimates of the correction to the secondary image (typically both are equal to zero) and $b_{line_0}$ and $b_{samp_0}$ are the matched correction to the base image corresponding to $s_{line_0}$ and $s_{samp_0}$ (computed for example via image correlation of the nominally registered images). $J_b$ and $J_s$ are the Jacobians of the base and secondary transformation functions with respect to world coordinates. $s_{line}$ and $s_{samp}$ is another nominal correction to the secondary image transformation and $b_{line}$ and $b_{samp}$ (computed as per equation 1 are the matched correction to the base image transformation that corresponds to $s_{line}$ and $s_{samp}$.

Pre-calculating the matched correction for each nominal secondary image correction results in nominally registered images with no image alignment error relative to the base image. This has three major advantages. Firstly, it results in a stable image comparison function, secondly it reduces the search space to be over the correction terms of the secondary image (and not the terms of both images) and thirdly, in cases where a correlation based image similarity function are used, the computation of this is simplified as it only needs to be computed for the case of zero offset which has the further benefit of rendering the image similarity function differentiable with respect to correction parameters to the secondary image (it removes the need to search the correlation output for its maximum—a non-analytical step). This is beneficial for the application of advanced optimisation techniques.

The value from the plurality of values for the measure of image similarity corresponding to greatest image similarity may be the maximum value. This value will occur when the corrections applied to the base and secondary transformations result in a registered image that is most similar to the base image. This must occur when the registered image and base image optimally overlay (the method ensures this is the case for all registered images), but importantly also when the features in the transformed image are represented in a manner most similar to the base image. Such a scenario can only occur when the secondary image has been accurately converted to World coordinates and then back to image coordinates i.e. any distortion effects owing to viewing geometry and three dimensional terrain are accurately corrected for. The value corresponding to the greatest measure of image similarity will thus represent a transformed image truly registered to the base image and will also represent the true bias corrections to the ground to image transformations.

In some embodiments of the invention a change detection operation may be applied to the registered image and base image. The change detection operation may identify features of the location that appear differently in the registered image and the base image, highlighting said differences on either of the registered image and base image. The change detection operation may simply output the image coordinates of said differences as an array of values. Other methods of outputting differences detected between the two images will be apparent to a person skilled in the art.

In some embodiments of the invention an image fusion operation may be applied to the registered image and base image. The image fusion operation may output an image comprising the registered image and base image overlaid with predetermined levels of transparency.

Some embodiments of the invention may comprise the additional step of identifying the corrected ground to image transformations for the base and secondary images, and using said transformations and the elevation information to convert the base and secondary images to orthorectified images. Owing to the fact that the registered image will only be generated when correct biases have been determined for the sensor metadata, the corresponding corrected ground to image transformations can be used to accurately convert image coordinates of features in the base and secondary images to World coordinates. The resultant images will have distortion effects removed such that the images are orthorectified. Orthorectified images are particularly useful for mapping and other applications where spatial information needs to be measured (distances between objects and features of the location).

Some embodiments of the invention may comprise the additional step of directing at least one sensor having a line of sight, such that the line of sight intersects the location and having the at least one sensor produce the first and second sensed images. A sensor or multiple sensors may be directed to image a location, said sensors comprising satellites, sensors on aircraft, or others. The sensors may be directed to image the location at the same time (for instance in different wavebands) or at different times (for instance if the requirement is to measure change). The sensors may have the same or different viewing geometries. The first and second sensed images may be stored on board the sensor or may be transmitted to a different location upon acquisition, or at some other time. The sensed images may be stored as digital images or as physical images (for instance photographic film) which can later be provided as digital images through other means (scanning for instance).

BRIEF DESCRIPTION OF THE DRAWINGS

A preferred embodiment of the invention will now be described by way of example only and with reference to the accompanying drawings, in which.

DETAILED DESCRIPTION

Figure 1:
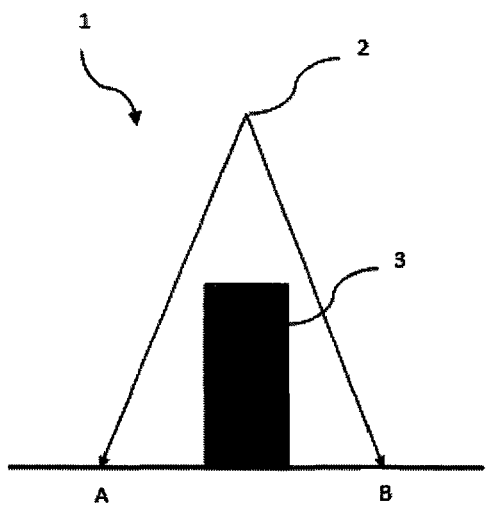
FIG. 1 shows a sensor observing a three dimensional location from nadir and corresponding image.
Figure 1:
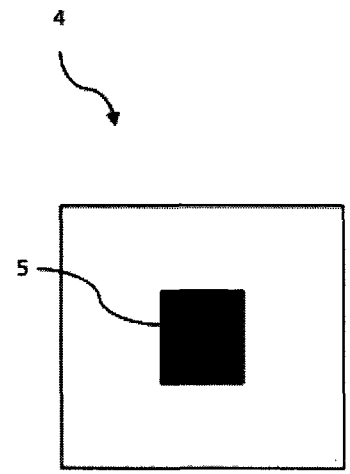
Figure 2:
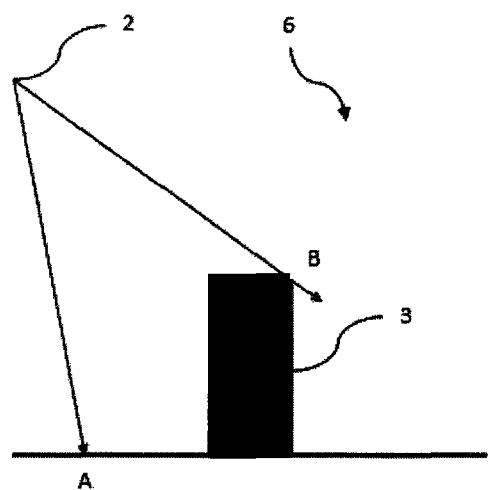
FIG. 2 shows a sensor observing a three dimensional location from off nadir and corresponding image.
Figure 2:
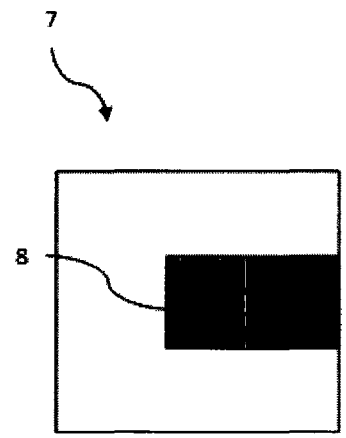

FIG. 1 shows a viewing geometry 1 of a sensor 2 observing a location. The location is three dimensional (not shown) and comprises a tall building 3. The viewing geometry 1 is such that the sensor 2 is observing the tall building 3 at the nadir. The field of view of the sensor is indicated by the two arrows originating at the sensor 2 and intercepting a physical object at points annotated A and B in the figure. The sensor 2 obtains a sensed image 4 which may be provided as a base digital image. The sensed image 4 shows a location comprising the top of a building 5 in the centre of the image. In contrast FIG. 2 shows a different viewing geometry 6 where a sensor 2 (which may be the same or a different sensor as used in FIG. 1) is observing the location comprising the same tall building 3, but away from the nadir position. The field of view of the sensor is indicated by the arrows and the point of intercept of the extremities of the field of view with a physical object are shown by the points annotated A and B. It is clear that the sensor 2 is now able to observe the side and top of the building 3. Again the sensor 2 obtains a sensed image 7 which may be provided as a secondary digital image. The tall building 8 is represented differently in this image when compared to the previous image 4. It is difficult to tell from the image 7 alone whether the feature 8 is a tall building or a wide building.

Figure 3:
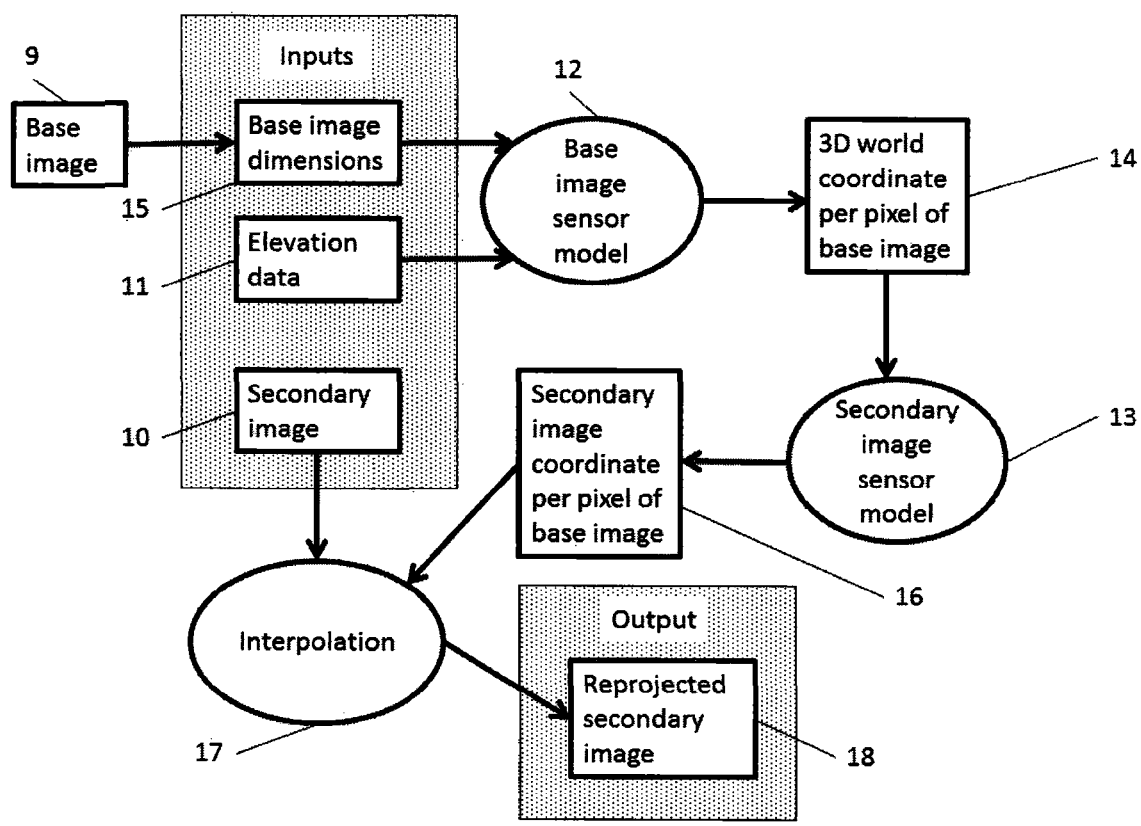
FIG. 3 shows a flow diagram of a prior art approximate approach to registering two sensed images via reprojection.

FIG. 3 shows a flow diagram of a prior art approach to registering a base image 9 and secondary image 10. Both images are provided as digital images. A digital elevation model 11 is provided in addition to a base sensor model 12 and a secondary sensor model 13. The first step in transforming the secondary image is to convert the image coordinates of the base image. This first step is achieved using the sensor model for the base image and elevation information. This yields a 3 dimensional world coordinate 14 for every pixel of the base image defined by its dimensions 15. The next step is to convert these world coordinates into image coordinates within the secondary image using the secondary image sensor model 12. The result of this step is an image coordinate in the secondary image for each pixel of the base image 16. This result can then be used to interpolate 17 the pixel values of the secondary image 10 onto a pixel grid that corresponds to the base image thereby reprojecting 18 the pixels of the secondary image onto a grid that corresponds to the base image. This method of image registration is approximate as it does not account for errors in either of the sensor modes or in the elevation data.

Figure 4:
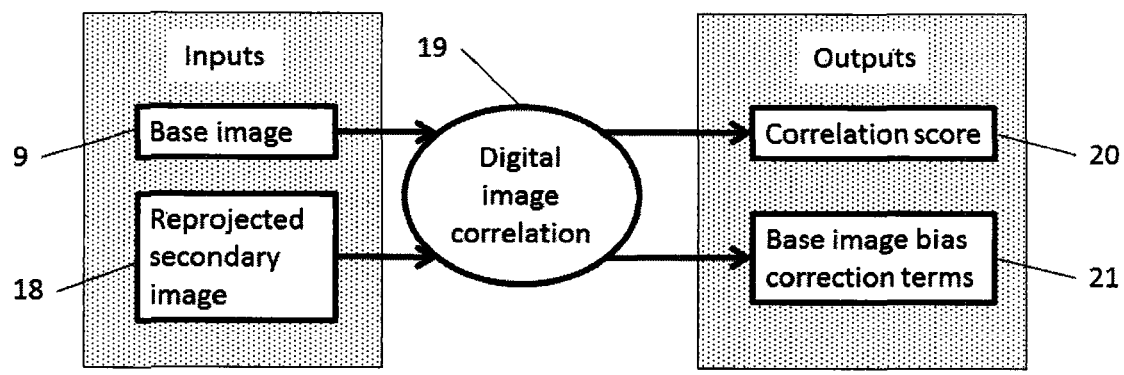
FIG. 4 shows a flow diagram of the derivation of the relative offset error of the invention.

FIG. 4 shows a flow diagram of the derivation of the relative offset error. FIG. 4 is applicable to the prior art design in FIG. 3, other possible approaches such as that shown in FIG. 5, and the embodiment of the invention shown in FIG. 5. In particular this uses elevation information provided as a digital elevation model and ground to image transformations provided as a secondary image sensor model and a base image sensor model as per FIG. 3 (Prior Art). The prior art approach in FIG. 3 is followed to obtain a reprojected secondary image 18. This image 18 and the base image 9 are then used as inputs to a digital image correlation calculation 19 (e.g. cross correlation or phase correlation). The output of which is a correlation score 20 and an offset 21 between the base image and the reprojected secondary image. The offset 21 can be applied to shift either the base image or the reprojected image such that they align with each other, or may be applied as a bias correction to the base image sensor model such that reapplying the prior art process in FIG. 3 yields a reprojected secondary image equivalent to the reprojected secondary image that was calculated using the uncorrected secondary image sensor model following a shift by the amount computed by the digital image correlation. This offset can be applied as the relative offset error of the present invention.

Figure 5:
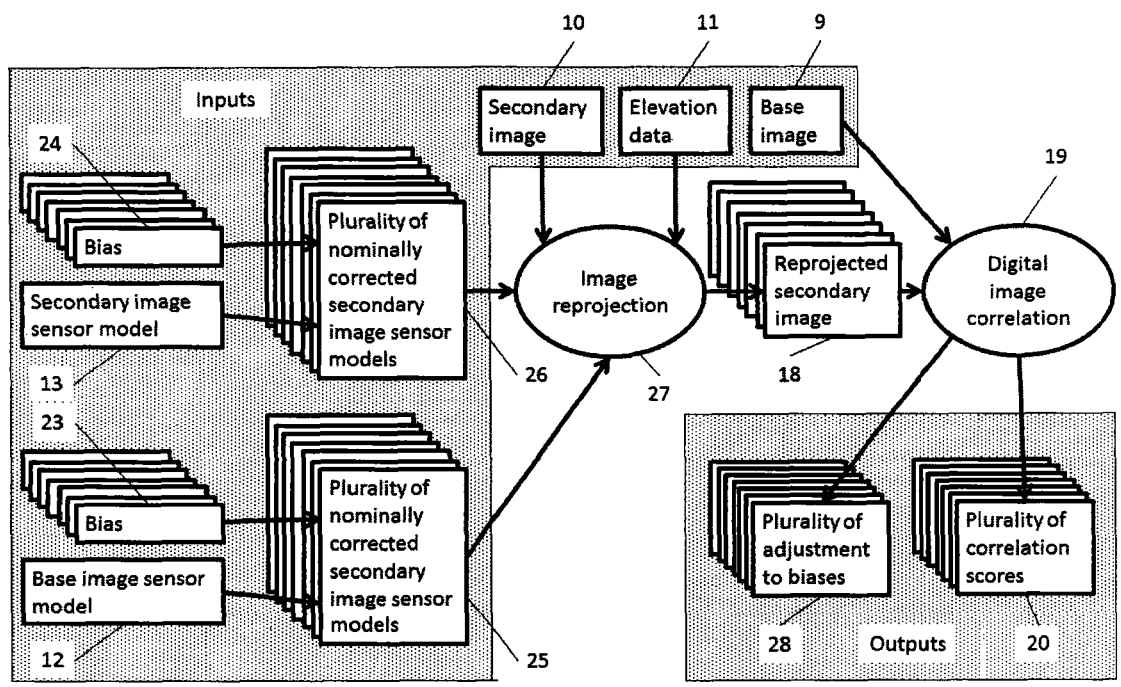
FIG. 5 shows a flow diagram of an alternative approach to aid understanding.
Figure 6:
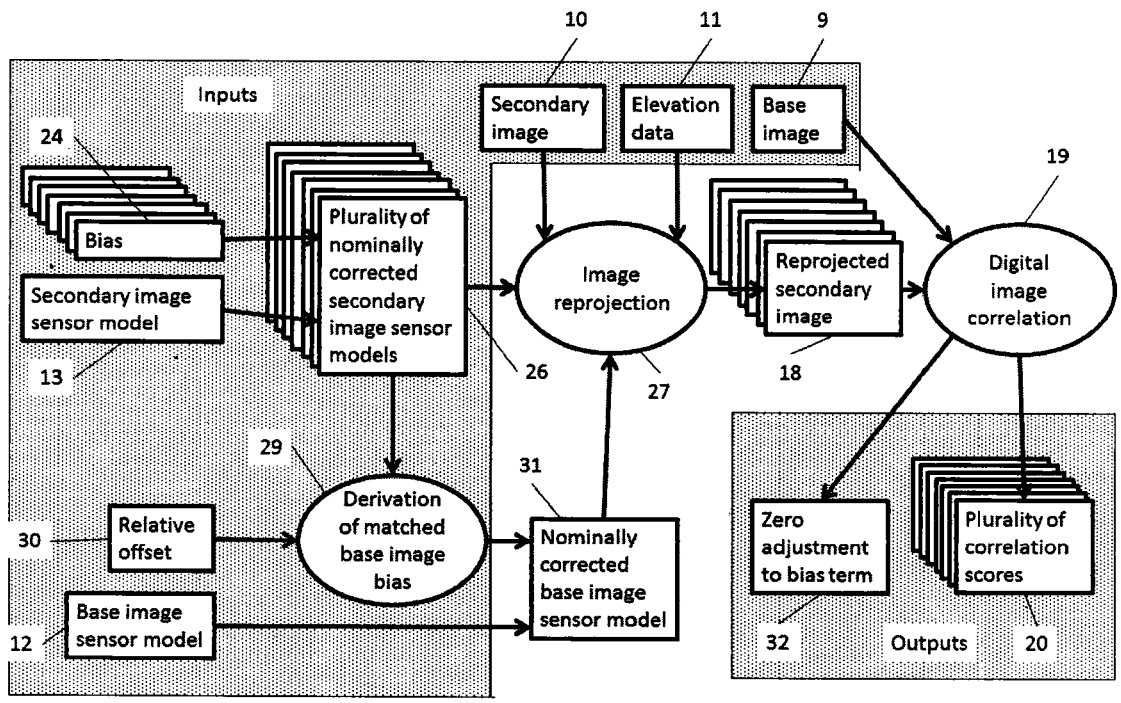
FIG. 6 shows a flow diagram of an embodiment of the invention.

FIG. 5 shows a flow diagram of an alternative approach which is described here to assist the reader in understanding the embodiment of the invention illustrated in FIG. 6. In particular this has image transformations provided as a base sensor model 12 and a secondary sensor model 13, and has elevation information 11 provided as a digital elevation model. The base image 9 and secondary image 10 are provided as digital images. A plurality of biases 23, 24 is applied to each of the base and secondary image sensor models to derive a plurality of modified sensor models for each image 25, 26. For each pair of modified base and secondary image sensor models, the reprojected secondary image 18 is computed as per FIG. 3, 27. A digital image correlation algorithm 19 is then applied to compute both a correlation score 20 and an offset 21 (not shown) from which adjustment to the bias corrections can be computed 28. The combination of base and secondary sensor model bias that yields the strongest correlation is deemed to be the correct value and the optimally corrected sensor models are taken to be the nominally corrected sensor models that yielded this strongest correlation, adjusted if necessary by the corresponding adjustment values.

FIG. 6 shows a flow diagram of an embodiment of the invention. In particular this embodiment has image transformations (not shown) provided as a base sensor model 12 and a secondary sensor model 13, and has elevation information 11 provided as a digital elevation model. The base image 9 and secondary image 10 are provided as digital images. A plurality of biases 24 are applied to secondary image sensor model to derive a plurality of nominally corrected sensor models 26. For each secondary image bias a corresponding matched bias is calculated 29 for the base image sensor model (possibly using a precomputed relative offset 30) to derive a nominally corrected base image sensor model 31. Then the reprojected secondary image is computed as per the prior art method shown in FIG. 3, 27 using each nominally corrected secondary image sensor model 26 and the nominally corrected base image sensor model 31. A digital image correlation algorithm 19 is then applied to compute both a correlation score 20 and an adjustment to the bias corrections 32. The combination of base and secondary sensor model bias that yields the strongest correlation is deemed to be the correct value and the optimally corrected sensor models are taken to be the bias terms that yielded this strongest correlation. As the base image bias should match the secondary image bias then the adjustment value 32 should be zero for all candidate biases.

Figure 7:
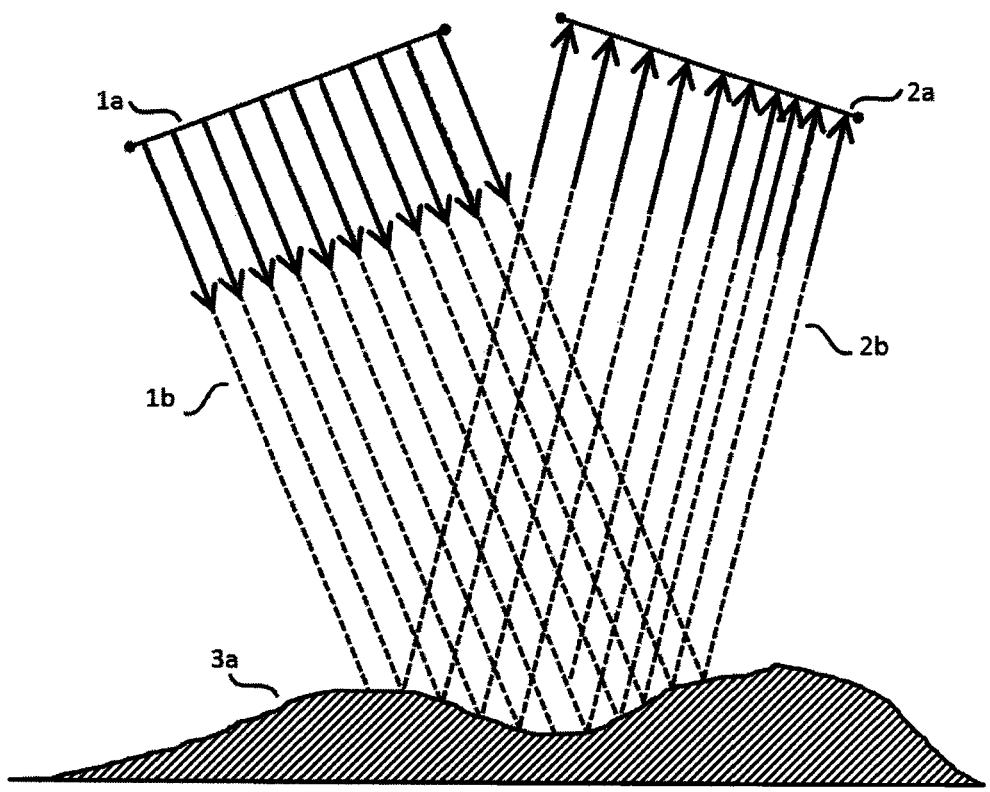
FIG. 7 shows a cross section of a terrain as viewed by two sensors.

FIG. 7 shows two images, 1a and 2a, of a scene 3a where the arrows 1b and 2b represent the ground to image relationship for images 1a and 1b respectively. As a whole the diagram shows how knowledge of the ground to image relationships and elevation data can be used to relate points in one image to their corresponding location in another.

Figure 8:
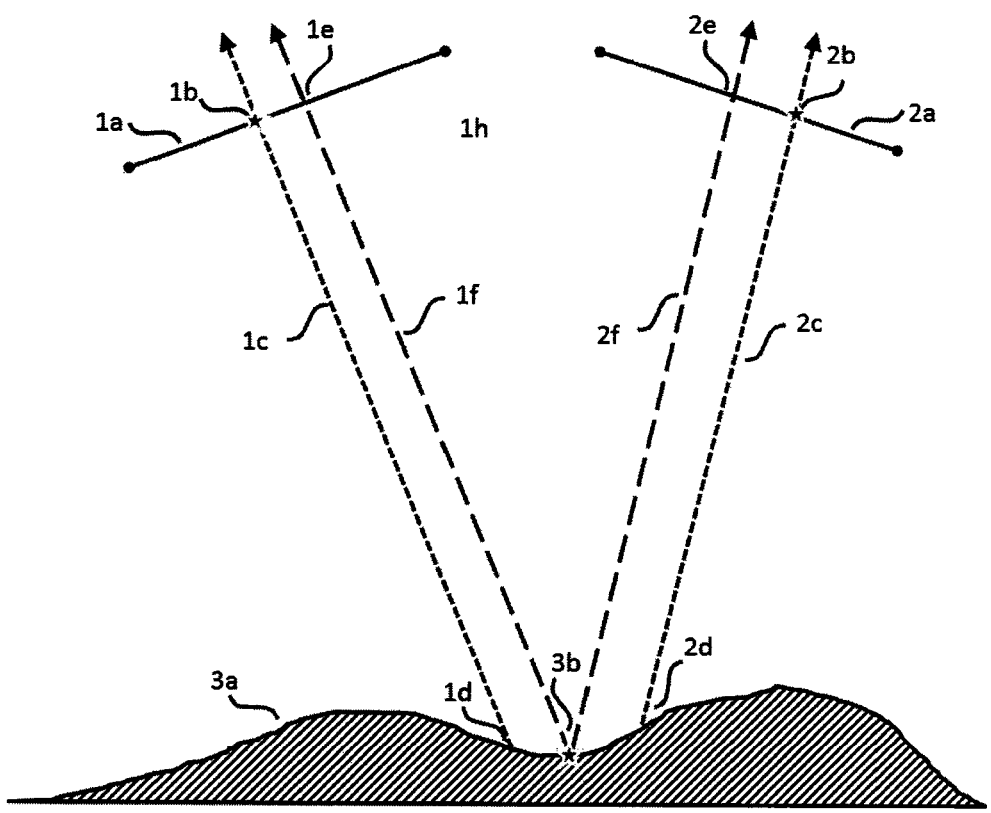
FIG. 8 shows an illustration of the errors present in typical ground to image transformations and their effect on the conversion between image and world coordinates

FIG. 8 shows the collection geometry of two images, 1a and 2a, of a scene, 3a. Points 1b and 2b in the respective images are pixels in each image that correspond to the feature on the ground located at 3b (represented by the star symbol ★). The raw ground to image transformations map the points 1b and 2b via 1c and 2c to the incorrect ground points 1d and 2d. The true ground point, 3b, is projected to the incorrect image positions 1e and 2e via the raw ground to image transformations 2f and 2f. Therefore a mapping from image 1a to image 2b using the illustrated ground to image transformations and elevation data would not map point 1b to point 2b.

Figure 9:
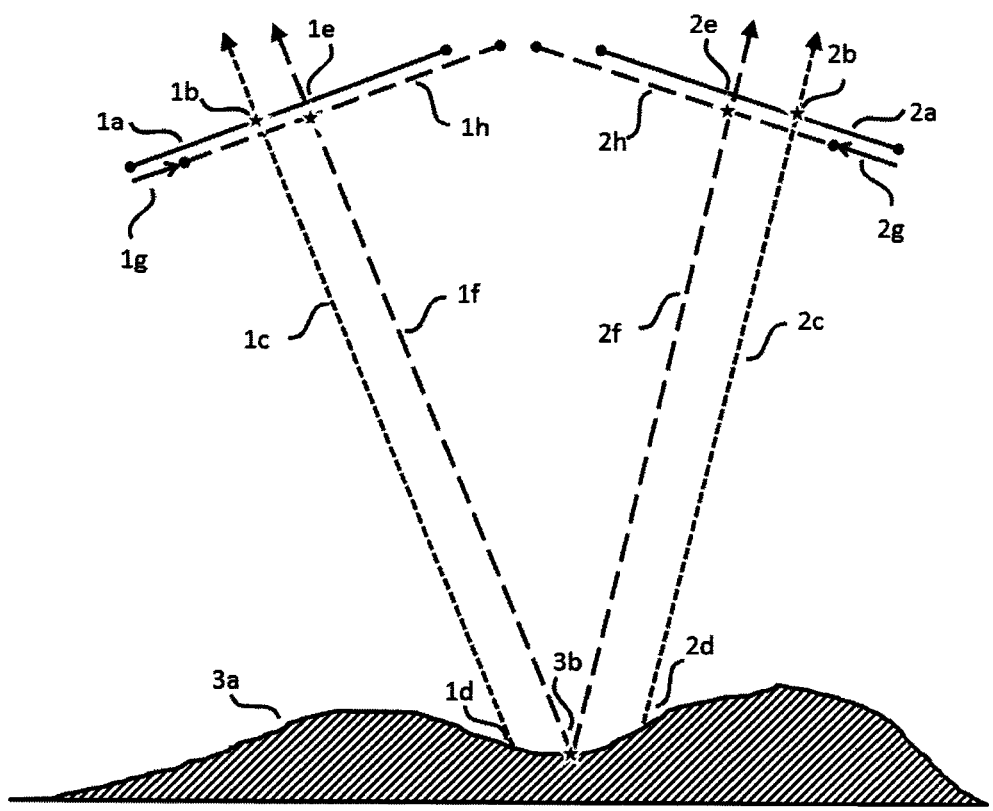
FIG. 9 shows an illustration of corrections to the ground to image transformations and their effect on the image to image relationship.

FIG. 9 shows the collection geometry of two images, 1a and 2a, of a scene, 3a. Points 1b and 2b in the respective images are pixels in each image that correspond to the feature on the ground located at 3b (represented by the star symbol ★). The raw ground to image transformations map the points 1b and 2b via 1c and 2c to the incorrect ground points 1d and 2d. The true ground point, 3b, is projected to the incorrect image positions 1e and 2e via the raw ground to image transformations 2f and 2f. 1g and 2g represent some correction to the ground to image transforms for images 1a and 1b, yielding corrected images 1h and 2h such that with the correction applied the ground point 3b now projects to the updated locations of image points 1b and 2b in the corrected images 1h and 2h.

Figure 10:
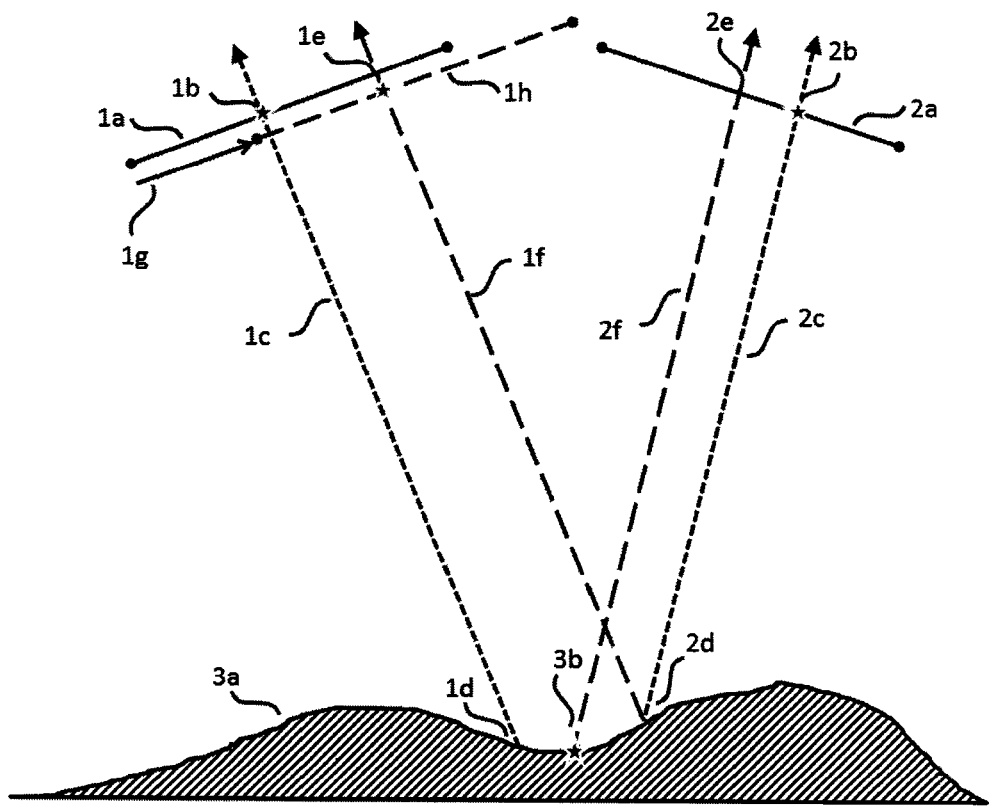
FIG. 10 shows an illustration of the relative correction of one image within a pair of images.

FIG. 10 shows the collection geometry of the same two images 1a and 2a, of the scene, 3a as in FIG. 9. Points 1b and 2b in the respective images are pixels in each image that correspond to the feature on the ground located at 3b (represented by the star symbol ★). The raw ground to image transformations map the points 1a and 2b via 1c and 2c to the incorrect ground points 1d and 2d. 1g is a correction to the ground to image transformation for image 1a that matches the uncorrected ground to image transformation for image 2a. This yields the corrected image 1h. This correction ensures that the image points, 1b and 2b which represent the same ground feature project to the same ground coordinate as each other (2d), but because image 2a has not been corrected, this ground coordinate is not in the correct location (it should be at 3b). However, despite this, the correction 1g to image 1a enables the point 1b in image 1a to be mapped to the point 2b in image 2a via the ground point 2d.

In more general terms, the present invention provides an apparatus and method for registering two recorded digital images having different transformations (information relating to the view from which the image was, or appears to be, taken from), so as to provide one or both images with a transformation adjusted to match that of the other, or to provide a correction of an estimated transformation.

The method involves translating or adjusting one or both transformations with respect to each other to maximise the degree they match, and then translating or adjusting the two transformations in tandem with respect to a 3D elevation model of the ground or object or environment, and determining the translation or adjustment which results in a best image match between the two images.

The invention is applicable to the fields of mapping, change detection, and image stitching and comparison of images including those of terrain, objects and physical environments, and to land management, flood management, medical scans and monitoring of historic or vulnerable buildings.

Further embodiments are set out in the claims.

The invention claimed is:

1. A method of registering a base recorded image of an object or terrain with a secondary recorded image of the object or terrain, comprising the steps:

providing the base and secondary recorded images with corresponding base and secondary image transformations, wherein the base and secondary image transformations each comprise information sufficient to enable a position in world coordinates to be translated into a location in the respective image;

providing a 3D model of the object or terrain;

identifying a relative offset error between the base and secondary image transformations;

identifying true absolute offset errors of the image transformations, to identify true transformations of the recorded images, by:

generating a plurality of pairs of modified transformations by:

applying a plurality of absolute offset errors to the secondary image transformation, to generate in each case modified secondary image transformations; and applying for each of the absolute offset errors, a corresponding matched-bias and also the identified relative offset error, to the base image transformation to generate a respective modified-base image transformation;

identifying which pair of modified transformations is most accurate by for each of the pairs, transforming at least one of the base and secondary digital images to generate a transformed image, using:

the modified-base image transformation of that pair;

the modified secondary image transformation of that pair, and;

the 3D model;

to provide two aligned images, and performing an image comparison of the aligned images, to generate a value for a measure of image similarity; and identifying the pair of modified transformations corresponding to the greatest image similarity, as being true image transformations; and outputting as an image registration, either one of the pair of true image transformations and a transformed image corresponding to one of the true pair of image transformations.

2. A method according to claim 1 wherein the image comparison operation is a correlation operation.

3. A method according to claim 2 wherein the measure of image similarity is a correlation score.

4. A method according to claim 1 wherein the base image transformation, and the secondary image transformation are provided by base and secondary sensor models.

5. A method according to claim 4 wherein the biases are applied to both the base and secondary sensor models, thereby generating a plurality of sets of modified-base and modified-secondary sensor models.

6. A method according to claim 5 wherein the biases applied to the base sensor model are calculated from the biases applied to the secondary sensor model.

7. A method according to claim 1 further comprising the step of applying a change detection operation to a registered image and base image.

8. A method according to claim 1 further comprising the step of performing an image fusion operation to a registered image and base image.

9. A method according to claim 1, wherein the matched biases are calculated according to:

$$\begin{pmatrix} b_{line} \\ b_{samp} \end{pmatrix} = \begin{pmatrix} b_{line_0} \\ b_{samp_0} \end{pmatrix} + J_b J_s^{-1} \begin{pmatrix} s_{line} - s_{line_0} \\ s_{samp} - s_{samp_0} \end{pmatrix}$$

where $J_b$ and $J_s$ are the Jacobians of the base and secondary transformations respectively, $b_{line_0}$ and $b_{samp_0}$ and $s_{line_0}$ and $s_{samp_0}$ are the initial estimates for the base and secondary image bias and $s_{line}$ and $s_{samp}$ are the next pair of secondary image biases and $b_{line}$ and $b_{samp}$ are the corresponding matched biases for the base image.

10. A method according to claim 1 further comprising the step of identifying the modified-base and modified-secondary sensor transformations corresponding to the maximum value for the measure of image similarity, and using sensor metadata and the elevation information to convert the base and secondary images to orthorectified images.

11. A method according to claim 1 further comprising the additional step of directing at least one sensor having a line of sight, such that the line of sight intersects the object or terrain and having the at least one sensor produce the base and secondary sensed images.

12. Apparatus for registering a base recorded image of an object or terrain with a secondary recorded image of the object or terrain, the apparatus comprising a computer processor and computer data storage jointly configured to:

provide the base and secondary recorded images with corresponding base and secondary image transformations, the base and secondary image transformations each comprise information sufficient to enable a position in world coordinates to be translated into a location in the respective image;

provide a 3D model of the object or terrain;

identify a relative offset error between the base and secondary image transformations;

identify true absolute offset errors of the image transformations, to identify true transformations of the recorded images, by:

generating a plurality of pairs of modified transformations by:

applying a plurality of absolute offset errors to the secondary image transformation, to generate in each case modified secondary image transformations; and applying for each of the absolute offset errors, a corresponding matched-bias and also the identified relative offset error, to the base image transformation to generate a respective modified-base image transformation;

identifying which pair of modified transformations is most accurate by for each of the pairs, transforming at least one of the base and secondary digital images to generate a transformed image, using:

the modified-base image transformation of that pair;

the modified secondary image transformation of that pair, and;

the 3D model;

to provide two aligned images, and performing an image comparison of the aligned images, to generate a value for a measure of image similarity; and identifying the pair of modified transformations corresponding to the greatest image similarity, as being true image transformations; and output as an image registration, either one of the pair of true image transformations and
a transformed image corresponding to one of the true pair of image transformations.

\* \* \* \* \*